United States Patent
Antoniuk et al.

(10) Patent No.: US 10,513,212 B1
(45) Date of Patent: Dec. 24, 2019

(54) LEG SUPPORT FOR VEHICLE SEAT

(71) Applicant: Faurecia Automotive Seating, LLC, Auburn Hills, MI (US)

(72) Inventors: Mateusz Antoniuk, Grójec (PL); Boris Von Kujawa, Stadthagen (DE); Andreas Rohlfing, Stadthagen (DE); Jacek Miszczak, Grójec (PL)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 0 days.

(21) Appl. No.: 16/021,778

(22) Filed: Jun. 28, 2018

(51) Int. Cl.
*B60N 2/90* (2018.01)
*B60N 2/02* (2006.01)

(52) U.S. Cl.
CPC .......... *B60N 2/995* (2018.02); *B60N 2/0232* (2013.01); *B60N 2002/0236* (2013.01)

(58) Field of Classification Search
CPC .................. B60N 2/995; B60N 2/0232; B60N 2002/0236
USPC ............. 297/423.29, 423.26, 426.25, 423.19
See application file for complete search history.

(56) References Cited

U.S. PATENT DOCUMENTS

| | | | |
|---|---|---|---|
| 5,352,020 A * | 10/1994 | Wade ................ | B64D 11/0643 297/423.26 |
| 5,651,587 A * | 7/1997 | Kodaverdian ....... | B60N 2/0228 297/423.36 |
| 6,652,033 B2 * | 11/2003 | Satoh .................. | B60N 2/0292 297/423.3 |
| 6,663,184 B2 * | 12/2003 | Hagiike ............... | B60N 2/0292 297/423.3 |
| 6,742,206 B1 * | 6/2004 | Han ...................... | A61G 5/006 280/250.1 |
| 6,764,137 B2 * | 7/2004 | Menard ................ | B60N 2/0232 297/423.36 |
| 6,773,074 B2 * | 8/2004 | Flory .................... | B60N 2/995 297/423.34 |
| 7,201,451 B2 * | 4/2007 | Baumann .............. | B64D 11/06 297/423.34 |
| 7,273,257 B2 * | 9/2007 | De Vroe ............... | A47C 1/035 297/330 |
| 7,866,755 B2 * | 1/2011 | Okano .................. | B60N 2/995 297/423.3 |
| 7,918,496 B2 * | 4/2011 | Mackert ............... | A47C 1/0352 297/423.28 |
| 8,444,225 B2 * | 5/2013 | Behe .................... | B64D 11/06 297/330 |
| 8,708,417 B2 * | 4/2014 | Mejuhas ................ | B60N 2/62 297/423.26 |
| 8,870,289 B2 * | 10/2014 | Yin ....................... | A47C 7/506 297/423.22 |
| 9,232,608 B2 | 1/2016 | Fujita | |
| 9,295,333 B2 | 3/2016 | Yin | |
| 9,408,472 B2 | 8/2016 | Kim | |
| 9,821,692 B2 | 11/2017 | Vyskocil | |
| 9,963,055 B2 * | 5/2018 | Seo ....................... | B60N 2/995 |
| 10,308,363 B2 * | 6/2019 | Ward .................... | A47C 7/506 |
| 2001/0033101 A1 * | 10/2001 | Plant ..................... | A47C 1/0352 297/342 |

(Continued)

*Primary Examiner* — Mark R Wendell
(74) *Attorney, Agent, or Firm* — Barnes & Thornburg LLP

(57) ABSTRACT

An occupant support may include a seat bottom and a seat back coupled to the seat bottom. In some embodiments, a leg support is coupled to the seat bottom and configured to support an occupant's leg when in an extended position.

15 Claims, 4 Drawing Sheets

(56) References Cited

U.S. PATENT DOCUMENTS

| | | | | |
|---|---|---|---|---|
| 2002/0063449 A1* | 5/2002 | Plant | ............... | B60N 2/34 |
| | | | | 297/68 |
| 2010/0244534 A1* | 9/2010 | Driessen | ............... | B60N 3/063 |
| | | | | 297/423.35 |
| 2015/0021969 A1* | 1/2015 | Yin | ............... | B64D 11/0643 |
| | | | | 297/423.26 |
| 2015/0028646 A1* | 1/2015 | LaPointe | ............... | A47C 7/506 |
| | | | | 297/423.29 |
| 2015/0284092 A1* | 10/2015 | Wilkey | ............... | B60N 2/919 |
| | | | | 297/423.29 |
| 2017/0174105 A1 | 6/2017 | An | | |
| 2017/0182915 A1 | 6/2017 | Seo | | |

* cited by examiner

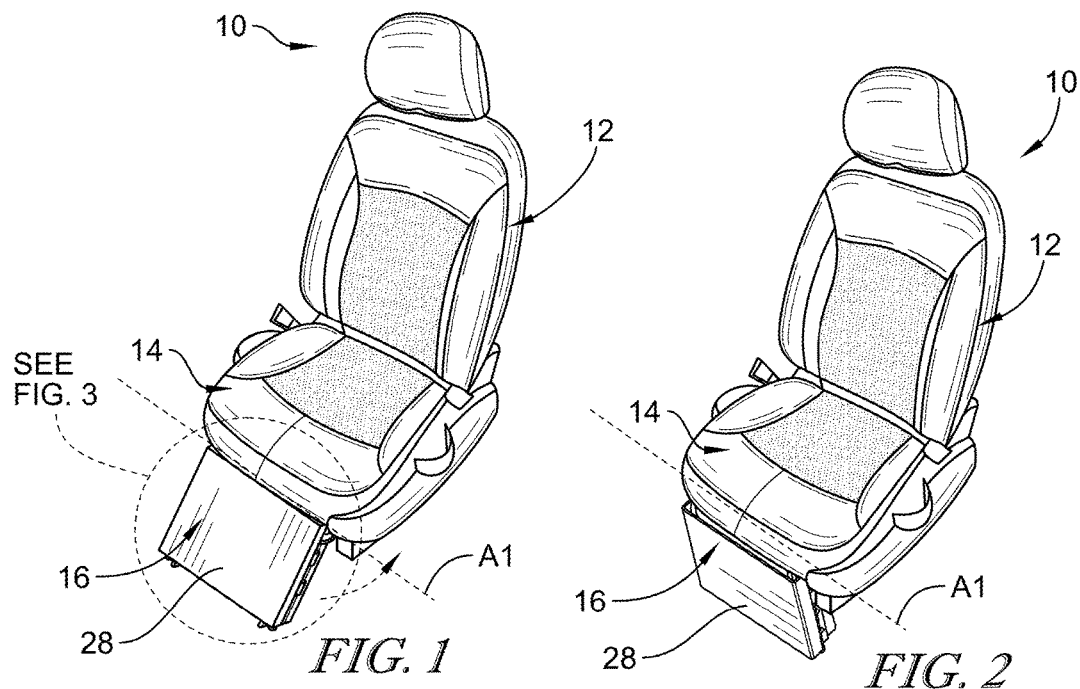
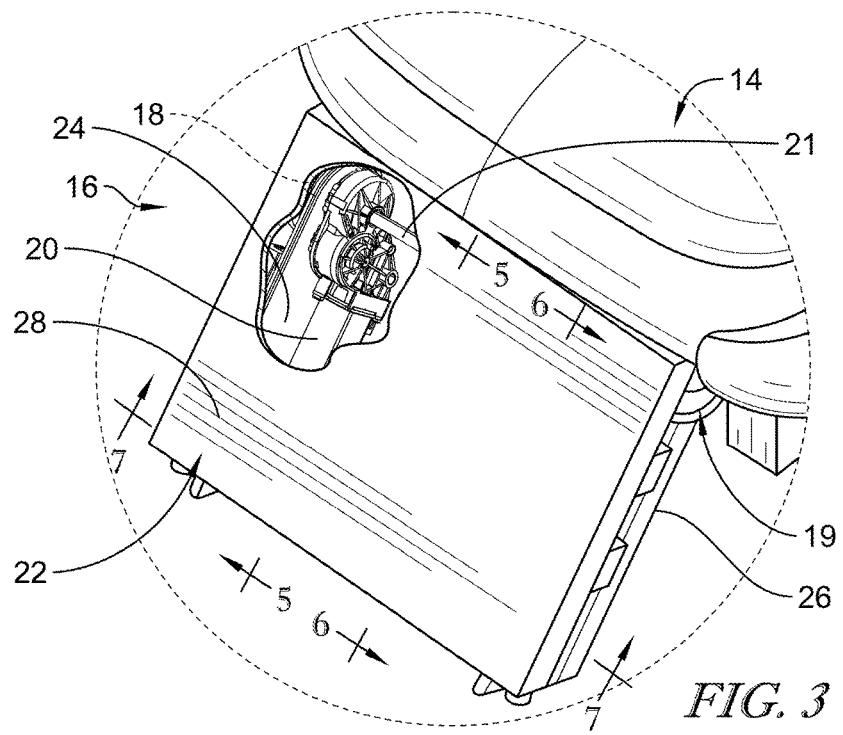

LEG SUPPORT FOR VEHICLE SEAT

BACKGROUND

The present disclosure relates to occupant supports, and particularly to movable occupant supports. More particularly, the present disclosure relates to occupant supports with leg supports for use in vehicles.

SUMMARY

According to the present disclosure, an occupant support includes a seat bottom and a seat back coupled to the seat bottom. The seat back is arranged to extend upwardly away from the seat bottom.

In illustrative embodiments, the occupant support includes a leg support coupled to the seat bottom to move relative to the seat bottom. The leg support is configured to support an occupant's leg when in an extended position.

In illustrative embodiments, the leg support includes a drive motor, a first rotation drive, and a support unit. The drive motor is coupled to the support unit in a fixed position relative to the support unit. The first rotation drive is arranged to extend between and interconnect the support unit and the seat bottom. The support unit is coupled to the first rotation drive to pivot about a lateral axis between a stored configuration and an extended configuration.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 shows a perspective view of an occupant support including a seat bottom, a seat back extending upwardly from the seat bottom, and a leg support located in an extended configuration and extending out from the seat bottom, and further showing that the leg support can pivot about a lateral axis to a stored configuration as suggested in FIG. 2;

FIG. 2 is a view similar to FIG. 1 with the leg support located in the stored configuration after it has pivoted about the lateral axis so that leg support does not extend out from the seat bottom;

FIG. 3 is an enlarged portion of a circled region of FIG. 1, showing that the leg support includes a support unit including a support plate and a portion of the support plate broken away to show a drive motor coupled to a first arm of the support unit, and further showing a square rod extending from the drive motor toward a second arm;

Figure 6:
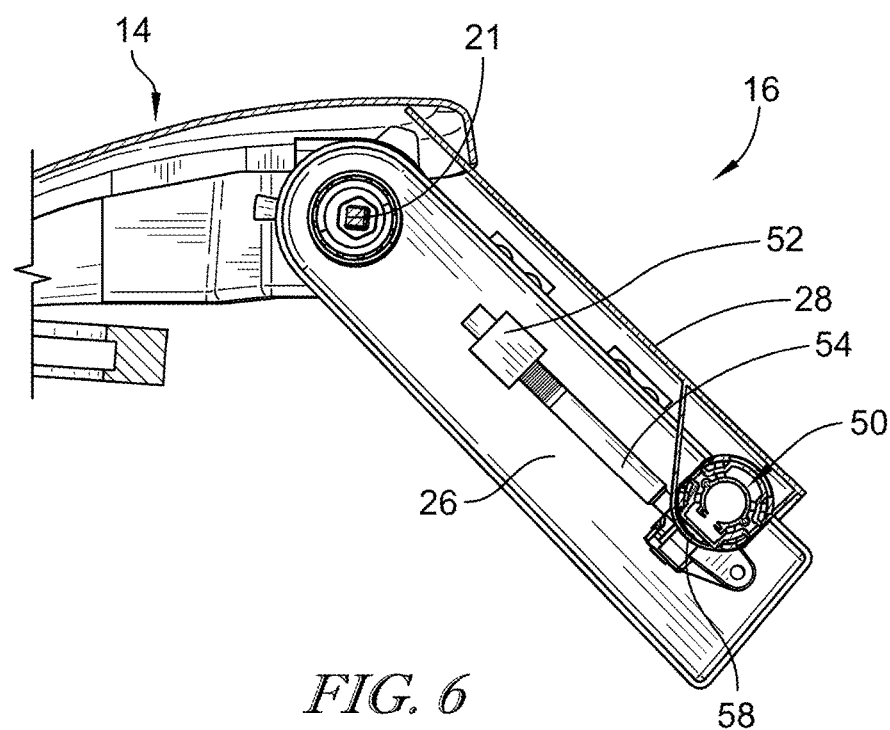
Figure 7:
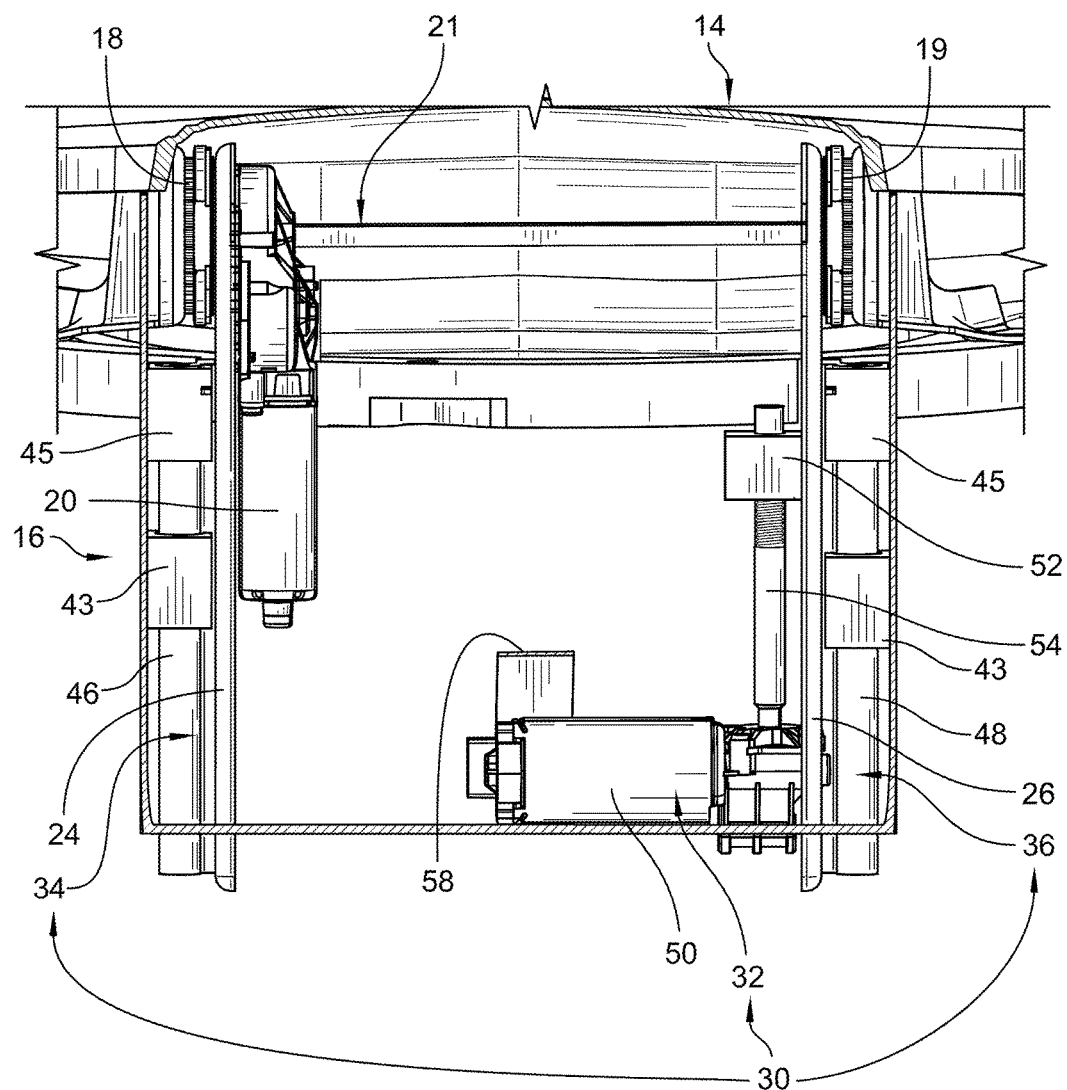

FIG. 6 is a sectional view taken along line 6-6 of FIG. 3 showing a length-adjustment unit extending between the support plate and the second arm, and further showing that the length-adjustment unit includes a length-adjustment motor unit including a length-adjustment motor, a spindle receiver, and a threaded spindle extending between the length-adjustment motor and the spindle receiver; and FIG. 7 is a sectional view taken along line 7-7 of FIG. 3 showing that the support plate is coupled to the first arm and the second arm by a first attachment slide and a second attachment slide, and that the first arm is located between the first attachment slide and the drive motor and the second arm is located between the second attachment slide and the length-adjustment motor.

DETAILED DESCRIPTION

A leg support 16 in accordance with the present disclosure is adapted for use with an occupant support 10, as shown in FIGS. 1-3. Occupant support 10 includes a seat back 12 and a seat bottom 14 coupled to seat back 12 to support an occupant in a seated position. Occupant support 10 further includes leg support 16 coupled to the seat bottom 14. Leg support 16 is configured to support an occupant's leg when in an extended configuration as shown in FIG. 1 and pivot about a lateral axis A1 to a stored configuration as shown in FIG. 2.

Leg support 16 is configured to pivot about lateral axis A1 relative to seat bottom 14 as shown in FIGS. 1 and 2. Leg support 16 includes a first rotation drive 18, a drive motor 20, and a support unit 22, as shown in FIGS. 1-4. First rotation drive 18 is coupled to seat bottom 14 and is configured to pivot support unit 22 in response to a force applied by drive motor 20. Drive motor 20 is coupled to support unit 22 in a fixed position relative to support unit 22. Support unit 22 pivots about lateral axis A1 in response to a force applied by the drive motor to pivot support unit 22 from the extended configuration shown in FIG. 1 to the stored configuration shown in FIG. 2. First rotation drive 18, drive motor 20, and support unit 22 cooperate to provide leg support when leg support 16 is in the extended configuration, as shown in FIG. 1.

Figure 4:
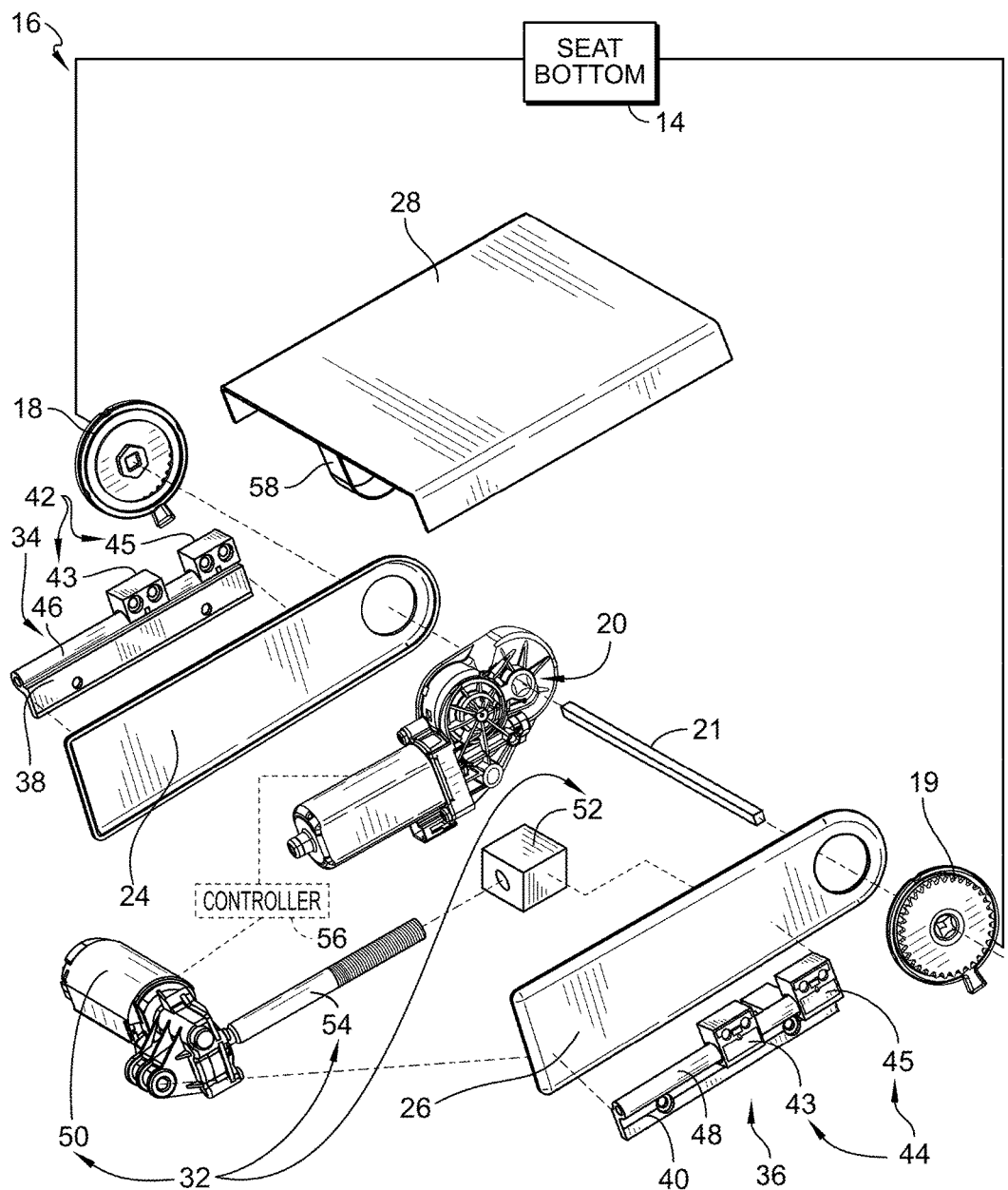
FIG. 4 is an exploded assembly view of the leg support of FIGS. 1-3 showing that the leg support includes a first rotation drive and a second rotation drive that are connected by the square rod and further showing that the support plate is coupled to the first arm and the second arm by a first slide unit and a second slide unit.

First rotation drive 18 is arranged to extend between and interconnect support unit 22 and seat bottom 14, as shown in FIGS. 1, 2, and 4. First rotation drive 18 is driven by drive motor 20 by a rod 21. In some embodiments, rod 21 has a square cross section. Illustratively, drive motor 20 rotates at a first speed and first rotation drive 18 rotates at a second speed that is generally less than the first speed of drive motor 20. In one example, first rotation drive 18 is configured to resist rotation of the support unit 22 during an impact event without power being supplied to the drive motor 20. Reference is hereby made to U.S. Patent Publication No. US2015/0306986 and U.S. Patent Publication No. US2018/0086229 for disclosure relating to mechanisms suitable for use as a rotation drive, which applications are hereby incorporated in its entirety herein.

Figure 5:
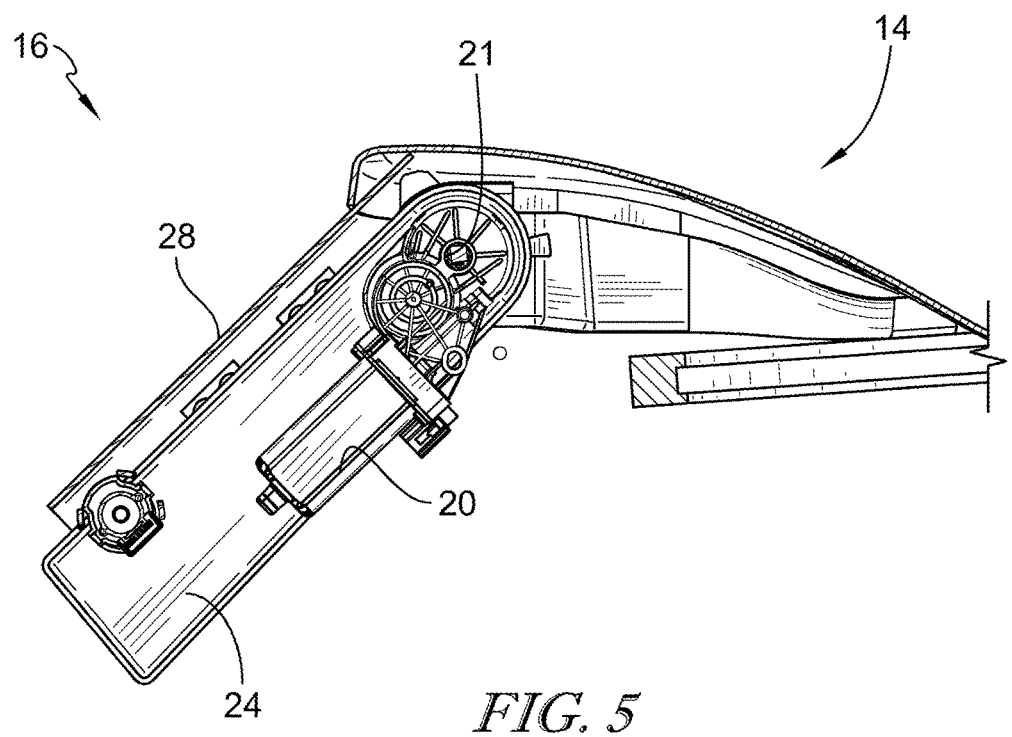
FIG. 5 is a sectional view taken along line 5-5 of FIG. 3 showing the drive motor coupled to the first arm and further showing that the support plate is spaced apart from the first arm.

Support unit 22 is coupled to first rotation drive 18 and is configured to pivot about lateral axis A1, as suggested in FIGS. 1 and 2. Support unit 22 includes a first arm 24, a second arm 26, and a support plate 28, as shown in FIGS. 1-3. First arm 24 is located between drive motor 20 and first rotation drive 18 as shown in FIGS. 3, 4, and 5. Second arm 26 is located in spaced-apart relation to first arm 24. Support plate 28 is coupled to first arm 24 and second arm 26. First arm 24, second arm 26, and support plate 28 cooperate to support an occupant's leg.

In some embodiments, leg support 16 includes a second rotation drive 19 as shown in FIGS. 3, 4, and 6. Second rotation drive 19 is located in spaced-apart relation to first rotation drive 18 as shown in FIGS. 4 and 7. Second rotation drive 19 is coupled to second arm 26 to locate second arm 26 between second rotation drive 19 and first arm 24. Drive motor 20 drives second rotation drive 19 by rod 21 as shown in FIGS. 4, 6, and 7 so that both first rotation drive 18 and second rotation drive 19 pivot support unit 22 about lateral axis A1 at about the same time.

Support unit 22 further includes length-adjustment unit 30 as shown in FIGS. 4-7. Length-adjustment unit 30 includes a length-adjustment motor unit 32, a first attachment slide 34, and a second attachment slide 36 as shown in FIGS. 4 and 7. Length-adjustment motor unit 32 extends between support plate 28 and second arm 26. First attachment slide 34 is coupled to first arm 24 between a first portion of support plate 28 and first arm 24. Second attachment slide 36 is coupled to second arm 26 and is located between a second portion of support plate 28 and second arm 26. Length-adjustment motor unit 32 cooperates with first attachment slide 34 and second attachment slide 36 to move support plate 28 along first and second attachment slides 34, 36. Support plate 28 is coupled to first and second attachment slides 34, 36 so that support plate 28 can move from a first position relative to the seat bottom to a second position relative to the seat bottom that is generally greater than the first position.

Each of first and second attachment slides 34, 36, include an arm mount 38, 40, a support plate mount 42, 44, and a slide unit 46, 48, as shown in FIG. 4. Arm mount 38, 40 is configured to couple first and second attachment slides 34, 36 to either first or second arm 24, 26. Support plate mount 42, 44 is configured to couple support plate 28 to either first or second attachment slide 34, 36. Slide unit 46, 48 extends between and interconnects arm mount 38, 40 and support plate mount 42, 44.

Length-adjustment motor unit 32 includes a length-adjustment motor 50, a spindle receiver 52, and a threaded spindle 54, as shown in FIGS. 4, 6, and 7. Length-adjustment motor 50 is coupled to support plate 28 with a length-adjustment motor bracket 58. Spindle receiver 52 is coupled to second arm 26. Threaded spindle 54 extends between length-adjustment motor 50 and is received by spindle receiver 52. Length-adjustment motor 50 rotates threaded spindle 54 to move support plate 28 along first and second attachment slides 34, 36 from a first position to a second position relative to the seat bottom. Illustratively, the second position is generally at a greater distance from seat bottom 14 than the first position. Illustratively, length-adjustment motor 50 rotates threaded spindle 54 so that support plate 28 travels in a direction that is generally orthogonal to lateral axis A1.

Support plate mounts 42, 44 include a first mount block 43 and a second mount block 45, as shown in FIG. 4. Each of first mount block 43 and second mount block 45 locate a portion of slide unit 46, 48 therein. Illustratively, each of first mount block 43 and second mount block 45 are coupled to support plate 28. First mount block 43 cooperates with second mount block 45 to allow support plate 28 to be moved by length-adjustment motor 50.

Illustratively, arm mount 38, 40 is coupled to first or second arm 24, 26 in a fixed position relative to first or second arm 24, 26 so that support plate 28 can move relative to first and second arm 24, 26 in response to a force applied by length-adjustment motor 50.

In some embodiments, occupant support 10 further includes a leg-support controller 56. Leg-support controller 56 is configured to power drive motor 20 to either extend or retract support unit 22 between the extended or stored configurations, as suggested in FIGS. 1 and 2. Leg-support controller 56 is further configured to power length-adjustment motor 50 to either extend or retract support plate 28 along first and second attachment slides 34, 36. In some embodiments, leg-support controller 56 simultaneously powers drive motor 20 to extend support unit 22 to the extended configuration and length-adjustment motor 50 to extend support plate 28.

The following numbered clauses include embodiments that are contemplated and non-limiting:

Clause 1. An occupant support including
a seat bottom and
a leg support coupled to the seat bottom and configured to support an occupant's leg when in an extended position.

Clause 2. The occupant support of clause 1, any other clause, or combination of clauses, wherein the leg support includes a drive motor, a first rotation drive, and a support unit.

Clause 3. The occupant support of clause 2, any other clause, or combination of clauses, wherein the drive motor is coupled to the support unit in a fixed position relative to the support unit.

Clause 4. The occupant support of clause 3, any other clause, or combination of clauses, wherein the first rotation drive is arranged to extend between and interconnect the support unit and the seat bottom.

Clause 5. The occupant support of clause 4, any other clause, or combination of clauses, wherein the support unit is coupled to the first rotation drive to pivot about a lateral axis between a stored configuration and the extended configuration.

Clause 6. The occupant support of clause 5, any other clause, or combination of clauses, wherein the leg support includes a second rotation drive located in spaced-apart lateral relation to the rotation driver and a connecting rod arranged to extend between and interconnect the two rotation drives so that movement of the support unit is coordinated.

Clause 7. The occupant support of clause 6, any other clause, or combination of clauses, wherein the connecting rod has a generally square cross-section shape.

Clause 8. The occupant support of clause 7, any other clause, or combination of clauses, wherein the support unit includes a first arm, a second arm located in spaced-apart relation to the first arm, and a support plate coupled to the first arm and the second arm.

Clause 9. The occupant support of clause 8, any other clause, or combination of clauses, wherein the first arm is located between the drive motor and the first rotation drive and the second arm is located between the drive motor and the second rotation drive.

Clause 10. The occupant support of clause 8, any other clause, or combination of clauses, wherein the leg support further includes a length-adjustment unit that includes a first attachment slide coupled to the first arm, a second attachment slide coupled to the second arm, and a length-adjustment motor coupled to the support plate and configured to move the support plate along the first and second attachment slides.

Clause 11. The occupant support of clause 5, any other clause, or combination of clauses, wherein the support unit includes a first arm, a second arm located in spaced-apart relation to the first arm, and a support plate coupled to the first arm and the second arm and each of the first arm and the second arm are configured to pivot about the lateral axis.

Clause 12. The occupant support of clause 11, any other clause, or combination of clauses, wherein the leg support further includes a length-adjustment unit that includes a first attachment slide coupled to the first arm, a second attachment slide coupled to the second arm, and a length-adjustment motor unit coupled to the support plate and configured to move the support plate along the first and second attachment slides.

Clause 13. The occupant support of clause 12, any other clause, or combination of clauses, wherein the first attachment slide is located between a first portion of the support unit and the first arm and the second attachment slide is located between a second portion of the support unit and the second arm.

Clause 14. The occupant support of clause 13, any other clause, or combination of clauses, wherein the support unit is attached to the first and second attachment slides so that the support unit can move from a first position relative to the seat bottom to a second position relative to the seat bottom and the support unit is at a first distance from the seat bottom in the first position and at a generally greater second distance from the seat bottom in the second position.

Clause 15. The occupant support of clause 12, any other clause, or combination of clauses, wherein each of the first and second attachment slides include an arm mount, a support plate mount, and a slide unit that extends between and interconnects the arm mount and the support plate mount.

Clause 16. The occupant support of clause 15, any other clause, or combination of clauses, wherein the support plate mount includes a first mount block and a second mount block that each locate a portion of the slide unit therein and are each coupled to the support plate.

Clause 17. The occupant support of clause 15, any other clause, or combination of clauses, wherein the arm mount is coupled to the arm in a fixed position relative to the arm so that the support plate can move relative to the arm in response to a force applied by a length-adjustment motor.

Clause 18. The occupant support of clause 12, any other clause, or combination of clauses, wherein the length-adjustment motor unit includes a length-adjustment motor coupled to the support plate, a spindle receiver coupled to the second arm, and a threaded spindle extending between and interconnecting the length-adjustment motor and the spindle receiver.

Clause 19. The occupant support of clause 18, any other clause, or combination of clauses, wherein the length-adjustment motor rotates the threaded spindle so that the support plate travels in a direction that is generally orthogonal to the lateral axis.

Clause 20. The occupant support of clause 5, any other clause, or combination of clauses, wherein the drive motor rotates at a first speed and the first rotation drive rotates at a second speed that is generally less than the first speed.

Clause 21. The occupant support of clause 20, any other clause, or combination of clauses, wherein the first rotation drive is configured to transmit a load relative to the drive motor in response to an impact force applied to the support unit without power being applied to the drive motor.

The invention claimed is:

1. An occupant support including
a seat bottom and
a leg support coupled to the seat bottom and configured to support an occupant's leg when in an extended position,
wherein the leg support includes a drive motor, a first rotation drive, and a support unit, the drive motor is coupled to the support unit in a fixed position relative to the support unit, the first rotation drive is arranged to extend between and interconnect the support unit and the seat bottom, and the support unit is coupled to the first rotation drive to pivot about a lateral axis between a stored configuration and the extended configuration,
wherein the support unit includes a first arm, a second arm located in spaced-apart relation to the first arm, and a support plate coupled to the first arm and the second arm, and
wherein the leg support further includes a length-adjustment unit that includes a first attachment slide coupled to the first arm, a second attachment slide coupled to the second arm, and a length-adjustment motor unit coupled to the support plate and configured to move the support plate along the first and second attachment slides.

2. The occupant support of claim 1, wherein the leg support includes a second rotation drive located in spaced-apart lateral relation to the first rotation drive and a connecting rod arranged to extend between and interconnect the first and second rotation drives so that movement of the support unit is coordinated.

3. The occupant support of claim 2, wherein the connecting rod has a generally square cross-section shape.

4. The occupant support of claim 2, wherein the first arm is located between the drive motor and the first rotation drive and the second arm is located between the drive motor and the second rotation drive.

5. The occupant support of claim 1, wherein each of the first arm and the second arm are configured to pivot about the lateral axis.

6. The occupant support of claim 1, wherein the first attachment slide is located between a first portion of the support unit and the first arm and the second attachment slide is located between a second portion of the support unit and the second arm.

7. The occupant support of claim 6, wherein the support unit is attached to the first and second attachment slides so that the support unit can move from a first position relative to the seat bottom to a second position relative to the seat bottom and the support unit is at a first distance from the seat bottom in the first position and at a generally greater second distance from the seat bottom in the second position.

8. The occupant support of claim 1, wherein each of the first and second attachment slides include an arm mount, a support plate mount, and a slide unit that extends between and interconnects the arm mount and the support plate mount.

9. The occupant support of claim 8, wherein the support plate mount includes a first mount block and a second mount block that each locate a portion of the slide unit therein and are each coupled to the support plate.

10. The occupant support of claim 8, wherein the arm mount is coupled to the arm in a fixed position relative to the arm so that the support plate can move relative to the arm in response to a force applied by a length-adjustment motor.

11. The occupant support of claim 1, wherein the length-adjustment motor unit includes a length-adjustment motor coupled to the support plate, a spindle receiver coupled to the second arm, and a threaded spindle extending between and interconnecting the length-adjustment motor and the spindle receiver.

12. The occupant support of claim 11, wherein the length-adjustment motor rotates the threaded spindle so that the support plate travels in a direction that is generally orthogonal to the lateral axis.

13. An occupant support including
a seat bottom and a leg support coupled to the seat bottom and configured to support an occupant's leg when in an extended position, wherein the leg support includes a drive motor, a first rotation drive, and a support unit, the drive motor is coupled to the support unit in a fixed position relative to the support unit, the first rotation drive is arranged to extend between and interconnect the support unit and the seat bottom, and the support unit is coupled to the first rotation drive to pivot about a lateral axis between a stored configuration and the extended configuration, and wherein the drive motor rotates at a first speed and the first rotation drive rotates at a second speed that is generally less than the first speed.

14. The occupant support of claim 13, wherein the first rotation drive is configured to transmit a load relative to the drive motor in response to an impact force applied to the support unit without power being applied to the drive motor.

15. An occupant support including a seat bottom and a leg support coupled to the seat bottom and configured to support an occupant's leg when in an extended position, wherein the leg support includes a drive motor, a rotation drive, a support unit, and a length-adjustment unit, the drive motor is coupled to the support unit in a fixed position relative to the support unit, the first rotation drive is arranged to extend between and interconnect the support unit and the seat bottom, and the support unit is coupled to the first rotation drive to pivot about a lateral axis between a stored configuration and the extended configuration, wherein the length-adjustment unit includes an attachment slide coupled to the support unit and a length-adjustment motor configured to move at least a portion of the support unit along the attachment slide.

* * * * *